United States Patent
Engel et al.

(10) Patent No.: US 7,898,430 B2
(45) Date of Patent: Mar. 1, 2011

(54) SYSTEM AND METHOD FOR OPPORTUNISTIC TRANSMISSION OF TEST PROBE METADATA

(75) Inventors: Glenn R. Engel, Snohomish, WA (US); Glen L. Purdy, Jr., Snohomish, WA (US); Mutsuya Ii, Shorline, WA (US); Jerry J. Liu, Sunnyvale, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1542 days.

(21) Appl. No.: 11/230,878

(22) Filed: Sep. 20, 2005

(65) Prior Publication Data

US 2007/0067360 A1    Mar. 22, 2007

(51) Int. Cl.
*G08C 17/00* (2006.01)
(52) U.S. Cl. .............................. 340/870.07; 340/870.02
(58) Field of Classification Search .................. 340/870, 340/850–856.4
See application file for complete search history.

(56) References Cited

U.S. PATENT DOCUMENTS

| | | | |
|---|---|---|---|
| 4,067,235 | A | 1/1978 | Markland et al. |
| 5,691,714 | A | 11/1997 | Mehnert |
| 2004/0046651 | A1 | 3/2004 | Norimatsu |
| 2005/0104976 | A1 | 5/2005 | Currans |
| 2005/0181781 | A1 * | 8/2005 | Starks et al. ................. 455/423 |

FOREIGN PATENT DOCUMENTS

| | | |
|---|---|---|
| FR | 2852433 | 9/2004 |
| GB | 2285867 | 3/1994 |
| GB | 2386194 | 9/2003 |
| GB | 2403043 | 12/2004 |
| GB | 2410553 | 8/2005 |
| GB | 2410554 | 8/2005 |

OTHER PUBLICATIONS

U.S. Appl. No. 11/230,395, filed Sep. 20, 2005, Engel et al.
U.S. Appl. No. 11/230,774, filed Sep. 20, 2005, Engel et al.
UK Intellectual Property Office, Examination Report under Section 18(3) dated Nov. 25, 2008.
GB Search Report dated Nov. 14, 2006.

\* cited by examiner

*Primary Examiner*—Brian A Zimmerman
*Assistant Examiner*—Hung Q Dang
(74) *Attorney, Agent, or Firm*—Matthew A. Pequignot; Pequignot + Myers LLC

(57) ABSTRACT

Measurement sensors are designed to provide metadata to data recording devices in an opportunistic manner to conserve bandwidth and/or power. In one embodiment, the metadata is communicated to the recording device during opportunistic periods, such as, for example, when actual data transmission can be skipped, or when battery level is high, or when there is enough bandwidth, i.e., other sensors are not using the full allocated bandwidth. In one embodiment, a plurality of sensors each only send a portion of their data such that all the portions taken together form the complete metadata. In another embodiment, each sensor only sends an identification of its type and the receiving device "looks up" the full metadata from a database.

17 Claims, 3 Drawing Sheets

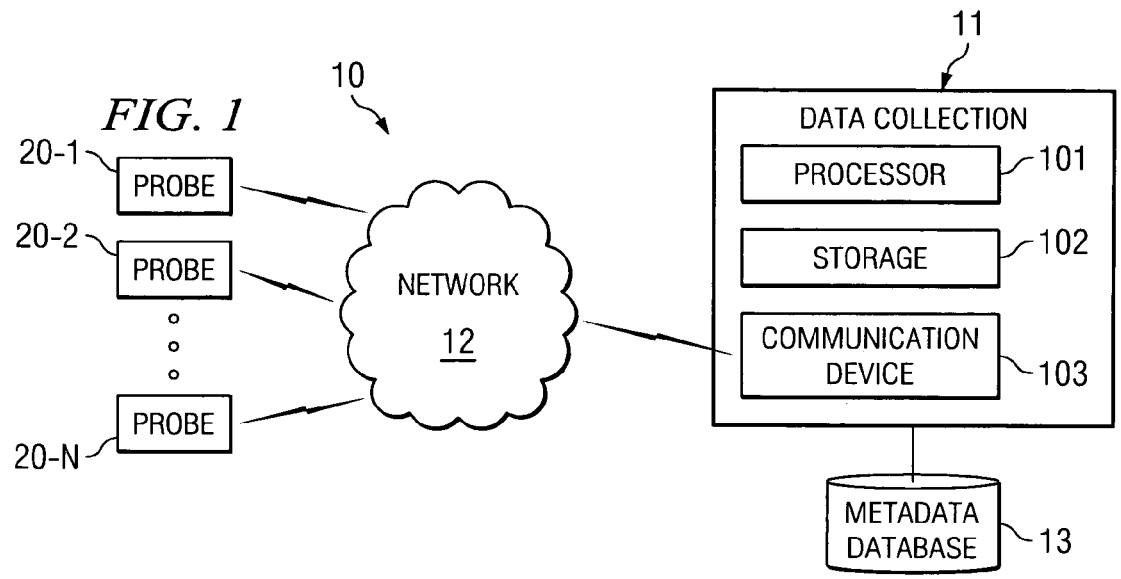
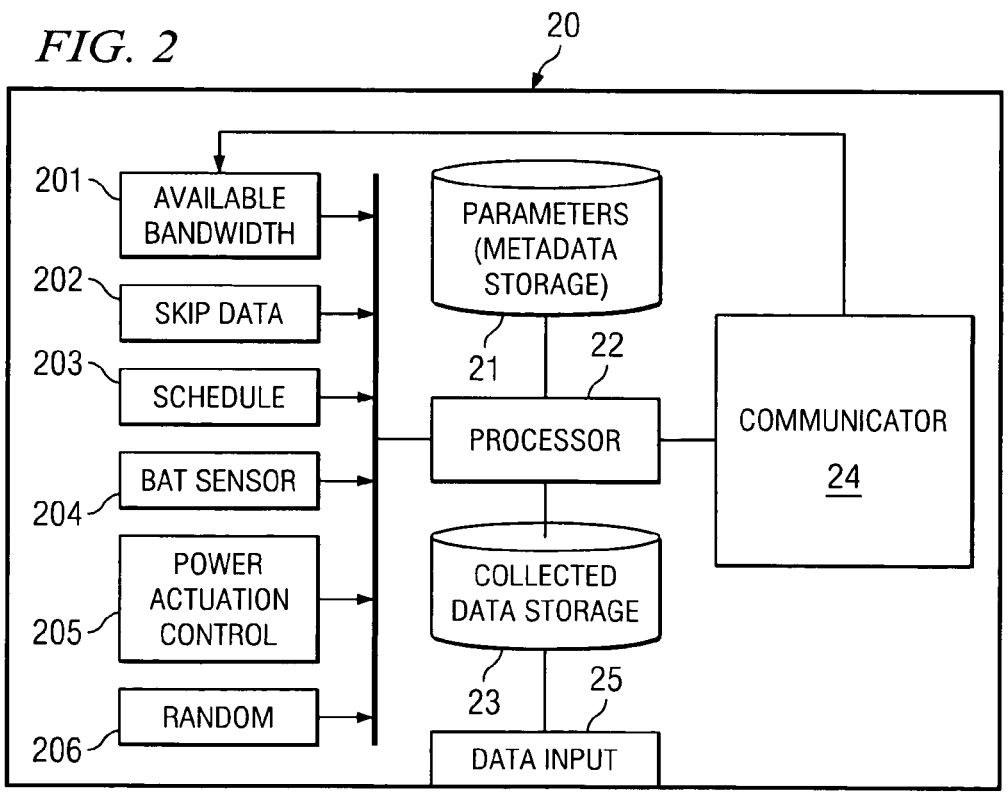

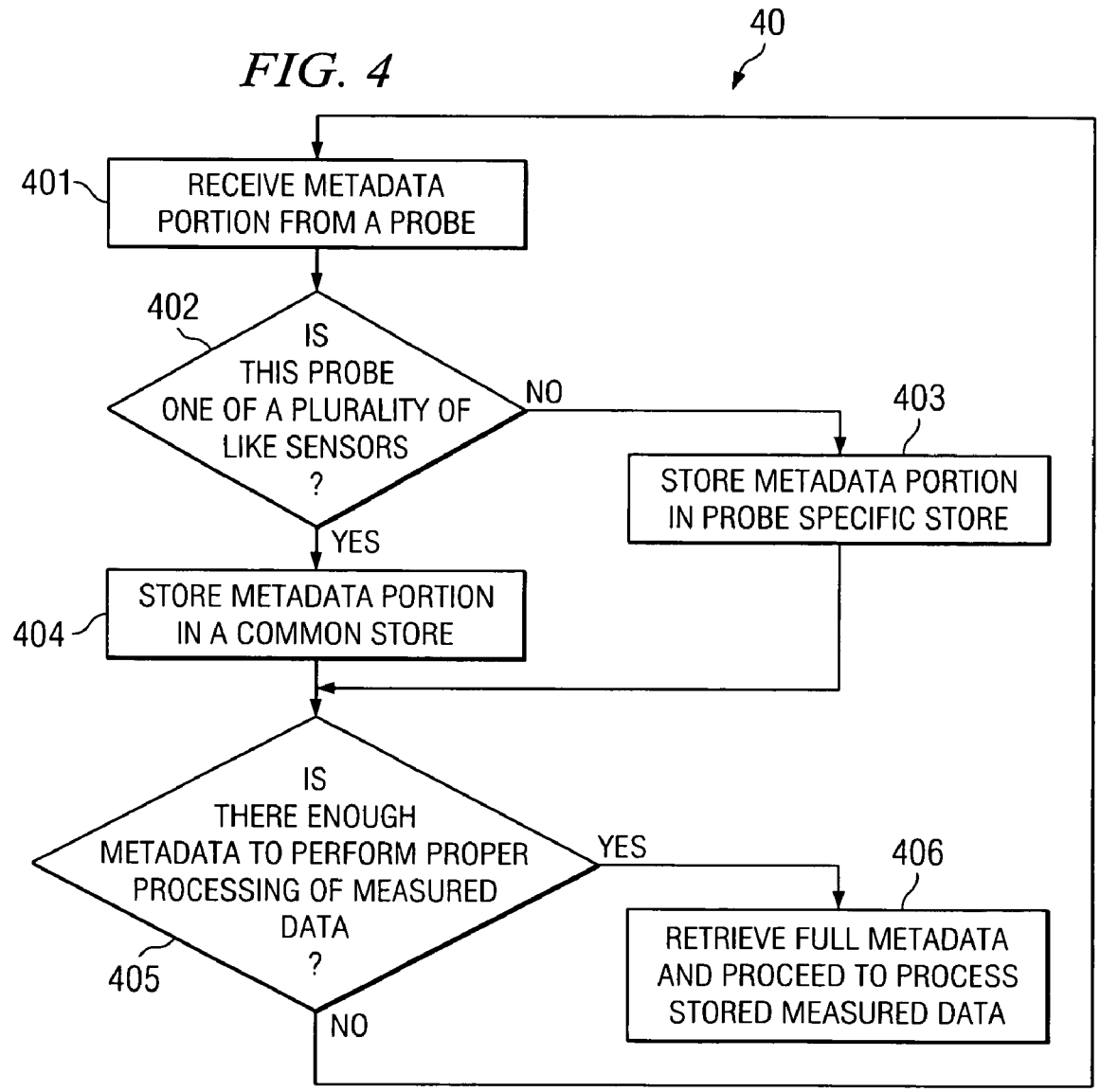

US 7,898,430 B2

SYSTEM AND METHOD FOR OPPORTUNISTIC TRANSMISSION OF TEST PROBE METADATA

TECHNICAL FIELD

This invention relates to communication of metadata from a test probe to a receiver and more particularly to a system and method for communicating the metadata in a manner to reduce bandwidth and conserve power.

BACKGROUND OF THE INVENTION

Test and measurement systems utilize multiple probes (sensors) that produce and consume various types of data. Probes vary greatly from one to another. For example, probes can measure different parameters, or use different units of measurement for the same parameter. It is important that when using data from a probe, the user (usually a test system) know what parameters, such as units of measurement, uncertainty of the measurement, description, name, data type, etc., the probe is using. In some systems, a new probe can come 'online' and the existing measurement system may not know what the sensor's parameters are. In some situations, the sensor may change parameters and this change must be communicated to the measurement system. Ideally, the sensor would communicate to the system using metadata to indicate the parameters of the data. This metadata is sent in addition to the measurement data from the probe.

However, as probe become smaller and less expensive it is common for the communication channel to be either very low bandwidth or for the sensor to have limited power. That is, the device can only send a small amount of data at any one time. The probe may additionally be constrained to only transmit data and may lack the capability of receiving data from the measurement system.

Traditional solutions either embed the metadata with every transmission (making the data self-describing) or they employ some type of query/response protocol allowing the system to discover and query the probe for various types of metadata that may be needed by the measurement system.

For example, a probe that produces an integer temperature reading every 10 seconds may have metadata that is several hundred times as large (in terms of bytes) as the measured temperature itself. When sending only the data, the probe can get by with a lower bandwidth/lower power communication scheme than it could if it had to send all the metadata with every reading. One solution is to have any measurement receiving device query the probe for its metadata so the probe does not have to send the metadata very often. However, this will not work if the probe is transmit only, or if the probe has a lot of different metadata to send, or if the probe has bandwidth constraints.

BRIEF SUMMARY OF THE INVENTION

In one embodiment, measurement probes are designed to provide metadata to a measurement system in an opportunistic manner. The opportunistic period can be, for example, when actual data transmission can be skipped, or when battery level is high, or when there is enough bandwidth such as when other probes are not using the full allocated bandwidth.

In one embodiment, a plurality of substantially similar probes are arranged to send only a portion of their data such that all the portions taken together form a complete metadata for all of the probes. In another embodiment, each probe only sends an identification of its type and the receiving device retrieves the full metadata from a database.

BRIEF DESCRIPTION OF THE DRAWINGS

FIG. 1 illustrates one embodiment of a system using an opportunistic transmission policy for transmission of metadata from a probe;

FIG. 2 shows one embodiment of a probe having various controls for sending metadata;

FIGS. 3 and 4 show embodiments of arrangements for opportunistic metadata collection from a plurality of probes.

DETAILED DESCRIPTION OF THE INVENTION

Figure 3:
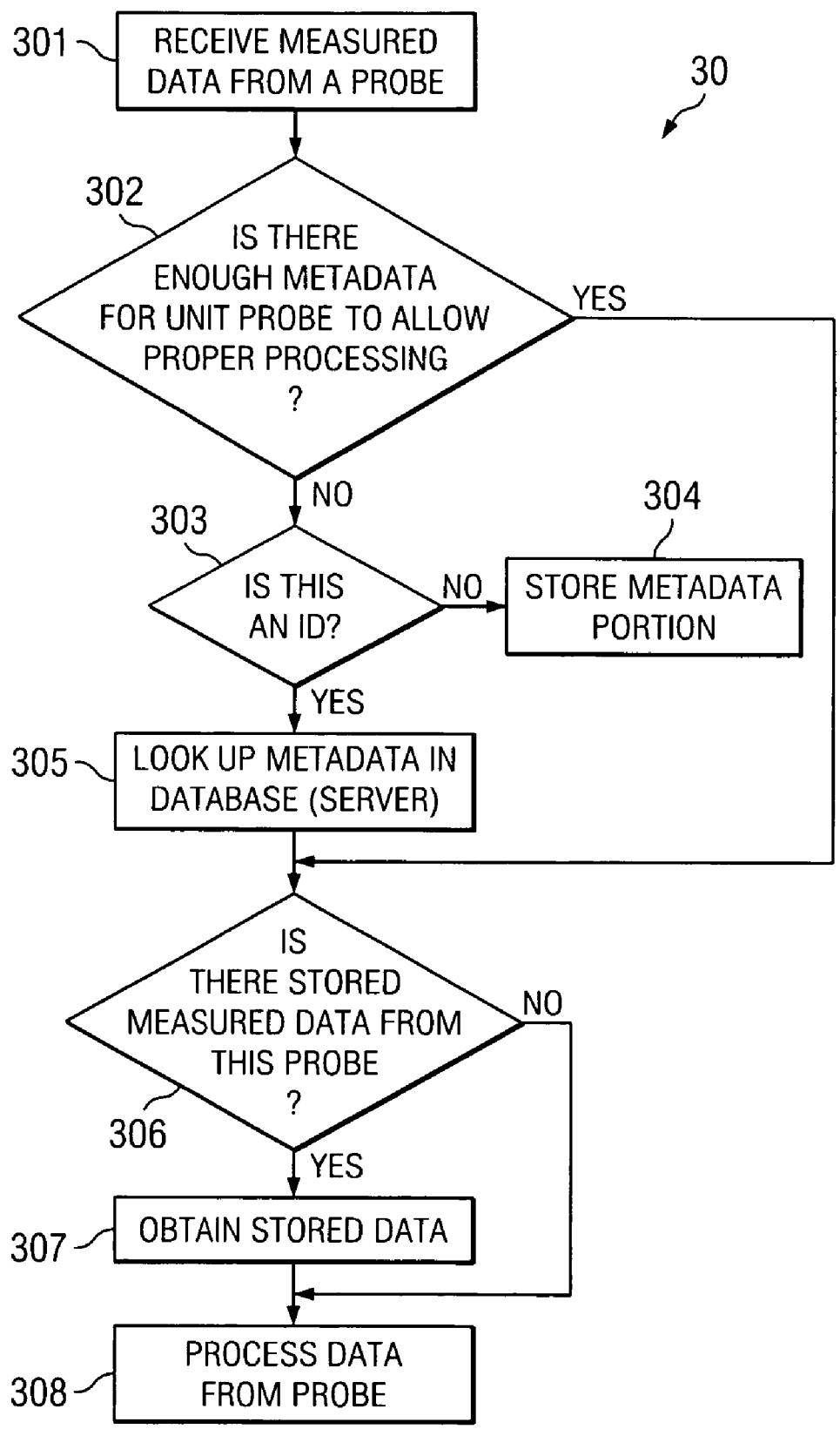

FIG. 1 illustrates one embodiment 10 of a system using an opportunistic policy for transmission of metadata from a probe (sensor), such as from probes 20-1 to 20-N. Device 20-1 can be configured, for example, to send its metadata spread over a period of time according to its internal constraints rather than all at once or on-demand. In this example, sensor 20-1 is a transmit-only sensor that is producing, for example, temperature readings. This sensor could occasionally transmit part, or all, of its metadata by omitting a regular scheduled reading. It could randomly insert the metadata transmission (e.g., once an hour, once a day, etc.), or it could wait for its battery level to be high, or it could use other opportunistic criteria useful to its situation.

As an example, consider that probe 20-1 has twenty discrete pieces of metadata that a data collection system, such as data collection system 11, requires to properly store and to utilize measurements from probe 20-1. Probe 20-1 could, for example, allocate 0.1% of its power or communication bandwidth to metadata and send a piece of metadata after every 1000th measured data transmission message. Accordingly, after 20,000 measurements have been communicated to data collection 101, perhaps for storage in data storage 102 under control of processor 101, all of the metadata would also have been communicated with a very small impact on power or bandwidth.

In the embodiment of FIG. 1, the data from probe 20-1 is transmitted to data collection 11 via network 12 either wirelessly or by wireline or by a combination thereof. Also note that a network need not be used, but rather some or all of the communications from probes 20-1 to 20-14 can be point-to-point using one or more wireless protocols, such as, for example, the Bluetooth protocol.

One side effect of this strategy is that data collection 11 may receive a piece of data (or several pieces of data) from one or more sensors without knowing what the data really means, i.e., without the parameters obtained from metadata. In such a case, data collection 11 would store the data and then wait some random amount of time to obtain enough metadata from the probe(s) to know what to do with the stored data. This is compatible with existing implementations where the metadata is queried from a sensor when new sensor data is received. The main difference is that in the system being described the latency between receiving the data and obtaining enough metadata is unknown. However, in the long run, the metadata is eventually delivered and the system can utilize the metadata when it arrives.

FIG. 2 shows one embodiment 20 of a probe having various controls for sending metadata. In the embodiment, metadata contained in storage 21 and data from the probe (for example data obtained via input 25), is stored in storage 23. Note that storages 21 and 23 can be the same storage if desired. Also note that the measured data sent from probe 20 need not be stored and can be sent directly from input 25 as collected. Input 25 can measure data, or sense data, or sense conditions and report the results of the "sensing". In addition, data can be provided to input 25 from other sensors. In the discussion herein, measured data sent from sensor 20 includes any mode or manner of collecting and sending such data. In the embodiment, data is sent under control of processor 22 and communicator 24.

Control units 201-206 allow various opportunistic metadata transfers, with each such metadata transfer usually being less than all of the metadata necessary for a data collected in a device, such as device 11 FIG. 1, to fully utilize the data sent from the probe. Also note that not all probes require all controls 201-206 and probes may have other controls or timers or sensors for controlling other opportunistic events.

One criteria the system could use when sending metadata would be to send some metadata only when the current collected data reading is the same as a previous data reading. Thus, instead of sending the same readings over and over, the probe, under control, for example, of skip data control 202, would use the energy to send metadata instead.

If desired, metadata could be trickled out a small bit at a time, with each measurement, for example, under control of schedule control 203, so the metadata only consumes a small amount of extra bandwidth or the metadata could be sent in atomic chunks or it could be broken up into small pieces and reassembled by data collector 11, FIG. 1. Reassembly of broken up metadata could be stateless if some other attribute of the communication provided a clue to reassembly. Such a "clue" could be a sequence number or time slot. A missed metadata element could be filled in later.

As shown in FIG. 1, metadata could be preloaded in a database (or server), such as database 13. In such a situation the probe would send a unique metadata ID. This ID would be used to look up the metadata in a database or could be used in the form of a URL or it may be a UUID in a global domain.

In some situations, combinations of metadata transfer can be used. For example, to eliminate database (or server) overload on startup, or when a high number of probes are added, some metadata could come from the probes in an opportune manner as discussed above and some metadata can be retrieved from the database as a result of an ID.

FIG. 3 shows one embodiment 30 of an arrangement for opportunistic metadata collection from a plurality of probes. The data collection can be at a single point, as shown for convenience in FIG. 1, or can be at a plurality of points (not shown). Process 301 receives data as measured from a particular probe, such as probe 20-1, FIG. 1. Probe 20-1 can be, for example, of a design as shown in FIG. 2, or of any other design, that sends portions of metadata on an opportunistic basis.

If process 302 determines there is not enough metadata already received then, process 303 determines if the received metadata portion is an ID (or points toward a server, etc.) then process 305 obtains the metadata (or the equivalent thereof). If the information received is not an ID then the metadata portion is stored by process 304. This mechanism could. also be used as a need determined acceleration of metadata retrieval. In other words, metadata can "trickle in" as noted in paragraph [0018] above until a measurement need arises where the complete metadata is necessary.

If process 302 determines that enough metadata is available for this probe such that the measured data can be further processed properly (or if metadata is available from process 305), then process 306 determines if there is stored measured data from this probe. If there is, then that data is retrieved via process 307 and all the data obtained from the sensor is processed by process 308.

Note that in this context further processing can take place at the data collection point or at other points in the system, not shown and includes manipulation of the data, storage of the data, together with its proper parameters (units of measurement, etc) or passing some or all of the data to a other locations together with the data's proper parameters.

FIG. 4 shows one embodiment 40 of an arrangement for opportunistic metadata collection from a plurality of probes. Process 401 receives a metadata portion from a probe in the manner discussed above. Process 402 (optionally) determines if the sensor is one of a plurality of like sensors such that portions of data can come from many sensors thereby reducing the time to receive the full metadata information stream. If the data is not from a plurality of like sensors, then process 403 stores the metadata portion in a sensor specific store. If the metadata portion is part of a common set of sensors then the data is stored in a common database via process 404.

Process 404 determines if there is enough metadata to perform proper processing of the received measured data. In this context, proper processing is any use of the measured data for any purpose where the use is dependant upon the system obtaining parameters of the data via the metadata associated with the probe from which the measured data is received.

If there is not enough metadata received then process 40 continues until there is enough. When enough metadata is retrieved, then process 406 retrieves the stored measured data proceeds to process the stored measured data.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A data collection system comprising a plurality of sensors and a data collection device, wherein each sensor comprises:

a program for transmitting data to the data collection device; wherein the data includes measured data and metadata for assisting the data collection device in utilizing any said delivered measured data; and a conditional control means for sending the data in separate transmissions including a first transmission and a second transmission, wherein the first transmission contains a portion of the measured data and the second transmission contains a portion of the metadata; wherein the second transmission occurs in dependence upon fulfillment of a predetermined condition originating at the sensor;

wherein the plurality of the sensors have the metadata common to the plurality of the sensors, wherein each sensor is programmed to send a different portion of the common metadata; and wherein the data collection device is operable to a) receive the first and the second transmissions from the plurality of the sensors; and b) combine the portions of the metadata of the second transmissions to obtain the metadata for assisting the data collection device in utilizing all of the delivered measured data obtained by the plurality of the sensors.

2. The data collection system of claim 1 wherein the control means is programmed for sending the portion of said metadata instead of the portion of said measured data.

3. The data collection system of claim 1 wherein the predetermined condition comprises: the portion of the measured data repeating a previously measured data.

4. The data collection system of claim 1 wherein the predetermined condition is selected from the list of: available bandwidth, skip data, schedule, high battery, power allocation between metadata and measured data, random.

5. The data collection system of claim 1, wherein all the sensors have substantially identical metadata and the data collection device is common to the plurality of the sensors; wherein each of the sensors comprises control means for randomly sending portions of said metadata from each sensor to said data collection device.

6. The data collection system of claim 1, wherein the data collection device is further operable to store data from each said sensor without performing analysis on said data until such time as enough metadata is collected from a sensor to utilize at least some of the delivered measured data.

7. The data collection system of claim 1, wherein the data collection device is further operable to combine the portions of the metadata of a particular one of the plurality of the sensors for assisting the data collection device in utilizing the measured data received from the particular sensor.

8. A data collection system comprising:

a plurality of sensors and a data collection device, wherein each sensor comprises:

a program for transmitting data to the data collection device; wherein the data includes measured data and metadata for assisting the data collection device in utilizing any said delivered measured data; and a conditional control means for sending the data in separate transmissions including a first transmission and a second transmission, wherein the first transmission contains a portion of the measured data and the second transmission contains a portion of the metadata; wherein the second transmission occurs in dependence upon fulfillment of a predetermined condition originating at the sensor; and wherein the data collection device comprises:

a processor for combining the portions of said metadata received by the data collection device; and a first storage for holding collected measured data from each said sensor until enough metadata has been received by the data collection device for assisting the data collection device in utilizing said measured data from said sensors;

wherein the plurality of the sensors have the metadata common to the plurality of the sensors, wherein each sensor is programmed to send a different portion of the common metadata; and wherein said processor is operable for combining the portions of the metadata from the plurality of the sensors for assisting the data collection device in utilizing all of the measured data obtained by the plurality of the sensors.

9. The data collection system of claim 8, wherein the predetermined condition is selected from the list of: available bandwidth, skip data, schedule, high battery, power allocation between metadata and measured data, random.

10. The data collection system of claim 8 further comprising: a second storage for storing metadata, each said metadata identified by an ID, wherein the conditional control means of the sensors are suitably programmed to transmit the corresponding IDs to the data collection device; and wherein said processor is operable for retrieving said metadata from the second storage, according to the corresponding ID received by the data collection device.

11. A data collection system comprising a plurality of sensors and a data collection device, each sensor comprising:

a program for transmitting data to a data collection device;

wherein the data includes measured data and metadata for assisting the data collection device in utilizing any said delivered measured data;

means for measuring data to be delivered to the data collection device;

means for delivering the metadata from said sensor to said data collection device; and means for sending the data in separate transmissions including a first transmission and a second transmission, wherein the first transmission contains a portion of the measured data, and wherein the second transmission contains a portion of the metadata, wherein the second transmission occurs upon fulfilling a predetermined condition originating at the sensor;

wherein the plurality of sensors all have substantially identical metadata and the data collection device is common to the plurality of the sensors; wherein each of the sensors comprises means for randomly sending a different portion of said metadata from each sensor to said data collection device.

12. The data collection system of claim 11 wherein the means for sending the data is programmed for sending the portion of said metadata instead of the portion of said measured data.

13. The data collection system of claim 11 wherein the predetermined condition comprises: the portion of the measured data repeating a previously measured data.

14. The data collection system of claim 11 wherein the predetermined condition is selected from the list of: available bandwidth, skip data, schedule, high battery, power allocation between metadata and measured data, random.

15. The data collection system of claim 11, wherein said portion of the metadata is an ID pointing to a metadata stored in a database remote from said sensor.

16. A data collection system for collecting data from a plurality of sensors, wherein each sensor comprises:

a program for transmitting data to the data collection device; wherein the data includes measured data and metadata for assisting the data collection device in utilizing any said delivered measured data; and a conditional control means for sending the data in separate transmissions including a first transmission and a second transmission, wherein the first transmission contains a portion of the measured data and the second transmission contains a portion of the metadata; wherein the second transmission occurs in dependence upon fulfillment of a predetermined condition originating at the sensor;

wherein the plurality of the sensors have the metadata common to the plurality of the sensors, wherein each sensor is programmed to send a different portion of the common metadata;

said data collection system comprising:

means for collecting the measured data from said plurality of sensors; and means for collecting the metadata from said sensors wherein said data collection system is operable for combining the portions of the metadata from the plurality of the sensors for assisting the data collection system in utilizing all of the measured data obtained by the plurality of the sensors.

17. The data collection system of claim 16 further comprising:

means for storing data from each said sensor without performing analysis of said data until such time when enough of the metadata is collected from at least one of the plurality of the sensors to allow utilization of the corresponding measured data.

* * * * *